United States Patent Office

2,946,829
Patented July 26, 1960

2,946,829

SELECTIVE HYDROGENATION AND PALLADIUM CATALYST THEREFOR

Merle Likins and John F. Strotman, Louisville, Ky., and Donald O. McCarthy, Tuscola, Ill., assignors to Chemetron Corporation, Chicago, Ill., a corporation of Delaware No Drawing. Filed July 15, 1958, Ser. No. 748,606

9 Claims. (Cl. 260—677)

This invention relates generally to the hydrogenation of highly unsaturated hydrocarbons and especially to the selective hydrogenation of acetylenes and diolefins in gas mixtures containing high concentrations of olefins. More particularly, the invention involves an improved noble metal catalyst for such reactions and selective hydrogenation reactions using the catalyst.

Acetylenic hydrocarbons, as well as diolefinic hydrocarbons, because of their relative reactivity, may be hydrogenated more readily than hydrocarbons containing one double bond (olefins). Therefore, preferential hydrogenation which is sometimes referred to as selective hydrogenation of acetylenes and diolefins in a gas mixture containing olefins is possible in the presence of an active catalyst by limiting the amount of hydrogen added. Such selective hydrogenation poses a difficult problem, however, when only small amounts of acetylenic or diolefinic impurities are present in the gas mixture and when it is necessary to effect substantially complete hydrogenation of the acetylenes and diolefins without appreciably lowering the olefin content in order to produce gas suitable for use as a synthetic intermediate. By way of example, gas mixtures consisting essentially of ethylene for the production of polyethylene in general should not contain more than about 25 parts per million of such highly unsaturated impurities as acetylene, methylacetylene, propadiene and other diolefins of low molecular weight. For use in some of the newer polymerization processes it has been found that the concentration of acetylenes and diolefins in the purified olefin gases should preferably not exceed 10 parts per million.

It has been found possible in the past to selectively reduce the highly unsaturated compounds in crude olefin mixtures by use of catalysts of modified activity, with the addition of substantial amounts of steam to absorb the heat of reaction and alleviate polymer formation on the catalyst. However, with gas streams containing no steam it has been found that the catalyst begins to lose activity, thereby requiring operations be carried out over a series of increasing temperature plateaus during the on-stream cycle. (See for example Bureau of Mines Information Circular 7376, pages 20–22.) This problem becomes further magnified when relatively concentrated olefin streams require purification rather than the crude olefin mixtures containing excess hydrogen and steam. In the separation of crude gases, such as deethanizer or depropanizer over head streams, the temperature in the fractionator is well below the freezing point of water. At this stage in the process the gas mixture contains mostly $C_2$ or $C_3$ hydrocarbons. As little as a fraction of a per cent water clogs the fractionation system since the lines immediately become frozen with ice. It is necessary, therefore, in order to provide a hydrogenation process for gas streams from sources of this kind to utilize a catalyst which will operate effectively at relatively low temperatures in the absence of moisture.

An important object of this invention is to provide a catalyst which is capable of hydrogenating small amounts of highly unsaturated compounds in dry olefin mixtures in such manner that the reaction proceeds virtually to completion at a relatively low temperature and with a low stoichiometric excess of hydrogen to reduce the concentration of such highly unsaturated compounds to a few parts per million without substantially affecting the olefin concentration. (As used herein, the term "highly unsaturated" means an organic compound containing more than one carbon-carbon double bond or one or more carbon-carbon triple bonds.) A related object is to provide a hydrogenation catalyst which is relatively active in promoting the hydrogenation of highly unsaturated hydrocarbons but relatively inactive in promoting the hydrogenation of olefins even in mixtures containing a major proportion of olefins. Another object is to provide a method of purifying olefin gas streams by removing acetylenes and diolefins by selective hydrogenation in the presence of a relatively inexpensive palladium catalyst on an alumina carrier. These and other objects are apparent from and are achieved in accordance with the following disclosure.

We have discovered that a superior selective catalyst may be readily made by incorporation of palladium upon an alumina carrier. Moreover, this catalyst is sufficiently active to complete hydrogenate highly unsaturated hydrocarbons at a commercially feasible rate and does not lose activity under process conditions over long periods of time. It has been found that by choice of a particular carrier material and by the method of catalyst preparation that the catalyst of this invention is especially suitable in that it will withstand the vigorous regeneration procedure to which the catalyst must be subjected every several weeks in order to remove polymer deposits without loss of physical strength or impairment of catalyst activity or selectivity.

As previously indicated the catalytically active material of our improved catalyst comprises palladium. The catalyst is prepared by spraying a concentrated solution of a palladium salt onto a carrier comprising alumina with a pore volume of between 0.0 to 0.4 cc./gm. at a threshold diameter of 800 A. and less. Preferred are alumina pellets having a surface pore volume in the range specified and an interior pore volume in the finished catalyst from 0.02 to 0.05 cc./gm. greater than that of the surface, at the same threshold level of measment. To prepare our improved catalyst the alumina carrier is sprayed with a concentrated aqueous solution of a palladium salt, the volume of which in relation to the volume of alumina is in the range of 1:12 to 1:5 to produce a catalyst containing 0.01% to 0.09% palladium by weight.

It has been found that by this method of preparation the concentrated palladium salt solution apparently is adsorbed by the micro pores of small diameter. Because of the limited amount of solution used and the method of application the metal is deposited upon the surface of the carrier and is not dispersed homogeneously throughout. It has been found that by this method of preparation the pore volume of the outer surface of the catalyst is reduced to less than that of the original carrier. However, an even more unexpected phenomenon occurs in that the pore volume of the interior of the catalyst pellet, although greater than the exterior, is reduced in relation to the pore volume of the original carrier material.

While the effect of such phenomena may not be readily appreciated, it has been found that the catalyst so prepared will maintain its activity at low temperatures in a concentrated olefin stream without the addition of steam. The catalyst has been found to be active with dry gas at temperatures as low as 100° F. and generally in the range of 125 to 400° F. and will effectively reduce the concentration of the unsaturated contaminants to a level of a few parts per million with as little as 30% stoichiometric excess of hydrogen. More surprising, however, is the fact that the catalyst does not suffer a permanent loss of activity even under extended periods of use.

As previously indicated, there is an effect of the pore volume reduction in relation to the activity and physical strength of the catalyst under process conditions. A possible explanation is offered in that the small micro pores of the surface of the carrier having been filled with the catalytic agent are not subject to and do not promote the deposition of carbonaceous materials. As a consequence, polymers do not form on the catalyst and the activity is not appreciably lessened. Further, since carbonaceous materials are not formed within the catalyst shell the mechanical strength does not deteriorate. The reason for the decrease of the pore volume within the center of the shell, as previously stated, is not understood; however, this, too, may add in increasing the strength of the catalyst. It is understood, of course, that the accuracy of the above postulations should not in any way be construed to limit the scope of this invention or of the claims appended hereto. Suffice it to say that when using catalysts containing palladium on a carrier having a surface pore volume of between 0.0 to 0.4 cc. per gram at the 800 Angstrom level, such catalysts are not deactivated in dry concentrated olefin streams.

The following examples will further illustrate the nature and scope of the present invention.

EXAMPLE 1

An impregnating solution was prepared by dissolving palladium nitrate in distilled water to obtain an 0.505% $Pd(NO_3)_2$ solution. To this solution was added a 1000 gram sample of Filtrol Grade 90 alumina tablets which had been calcined for 8 hours at 900° F., soaked in water, and air-dried for 15 minutes. This material had a pore volume of 0.35 cc./gm. (pores with a threshold diameter of less than 800 A.). After soaking in the $Pd(NO_3)_2$ solution for 15 minutes the tablets were removed and drained for 30 minutes. The impregnated catalysts were calcined for 8 hours at 900° F. before being analyzed for palladium. Analysis of the impregnated tablets showed a palladium concentration of 0.2%, indicating substantial hydrolysis of the palladium onto the carrier.

A charge of this material was placed in an isothermal reactor and a dry gas of the following composition was passed over the catalyst:

|  | Percent |
| --- | --- |
| Propylene | 78.00 |
| Propadiene | .32 |
| Hydrogen | 4.50 |
| Nitrogen | 10.00 |
| Propane | 7.00 |

Table I

| Hours on Stream | Temp., °F. | Pressure | S. V.[1] | $C_3H_4$, p.p.m. | |
| --- | --- | --- | --- | --- | --- |
| | | | | In | Out |
| 16 | 245 | 260 | 300 | 3,200 | 35 |
| 22 | 250 | 260 | 580 | 3,200 | 165 |
| New cylinder of gas substituted—high in propadiene | | | | | |
| 25 | 305 | 270 | 502 | 5,450 | 190 |
| 43 | 305 | 280 | 575 | 5,450 | 210 |

[1] Space velocity—volumes of gas per volume of catalyst per hour, computed at 60° F. and at 14.7 p.s.i.a.

As will be noted, this catalyst operated satisfactorily for the first sixteen hours, lowering the propadiene concentration to about 35 parts per million (0.0035%). Thereafter, however, the catalyst began to lose activity which could not be fully compensated for by an increase in temperature.

Another batch of the impregnated catalyst was charged to an isothermal reactor and hydrogen was passed thereover at a temperature of 750° F. for 8 hours. Thereafter a gas of substantially the same composition was passed over the catalyst at a nominal space velocity of 500 and a pressure of 275 p.s.i.g. During the first day of operation at a temperature of 220° F. a propadiene leakage of 45 p.p.m. was noted, whereas by the second day at a temperature of 250° F. the leakage had increased to 130 p.p.m. and by the third day the leakage had increased to 325 p.p.m. at a temperature of 250° F.

Pore volume determinations showed that both the interior and exterior surfaces of the catalyst were substantially identical to each other and to that of the alumina used originally in preparing the catalyst, i.e. about 0.35–0.36 cc. per gram for pores having a threshold diameter of 800 A. and less and about 0.33 cc. per gram for the exterior and 0.34 cc. per gram for the interior for pores having a threshold diameter of 270 A. and less.

EXAMPLE 2

Fifty gallons of pelleted alumina tablets, of the same type as used in Example 1, previously calcined at 1100° F. were charged to a mixing apparatus similar in action to a concrete mixer and having an inclined, revolving mixing chamber. An impregnating solution containing about 9.3 grams of palladium per liter was prepared by dissolving palladium chloride in distilled water containing hydrochloric acid. This solution was sprayed onto the tablets in the revolving drum of the mixer using approximately one gallon of solution per seven gallons of pills and allowing about one gallon excess for loss on the walls of the revolving drum. The pills were removed from the drum and calcined at 950° F. for 6 hours. These catalyst pellets had a crush strength of about 18 pounds D.W.L. before use. Analyses indicated a palladium concentration of 0.04%. The pore volume of the exterior surface of the catalysts amounted to 0.27 cc./gram and the pore volume of the interior surface amounted to 0.31 cc./gram expressed as pores having a threshold diameter of less than 800 A. The pore volume expressed as pores having a threshold diameter of less than 270 A. amounted to 0.21–0.23 cc./gram for the exterior surface of the catalyst and to about 0.28–0.29 cc. per gram for the interior surface of the catalyst.

It will be noted that the decrease in pore volume for the exterior surface of the pellets over the interior surface of the pellet was slightly greater at the 270 A. level than at the 800 A. level, indicating that the smaller micro pores were affected more than the larger micro pores. The data show that pores having a diameter in the range of between 270 A. and 800 A. were affected to a lesser extent if at all. Even more surprising, however, was the decrease in pore volume of the interior of the catalyst over that of the original alumina and that of the interior of the impregnated catalyst of Example 1.

One liter of the catalyst was charged to a pilot plant scale reactor and reduced with hydrogen for eight hours. Thereafter a gas of the following composition was passed through the reactor at a space velocity of 500, a pressure of 275 p.s.i.g., a temperature of 200° F. and a hydrogen rate of three times the theoretical rate (based on hydrogenation of propadiene to propylene).

|  | Percent Mol |
| --- | --- |
| Methane+inerts | 0.1 |
| $C_2$ hydrocarbons | 4.0 |
| $C_3H_4$ | 1.1 |
| $C_3H_6$ | 89.0 |
| $C_3H_8$ | 5.8 |
| $C_4+C_5$ hydrocarbons | 0.03 |

Throughout a forty-day run the catalyst gave 95–100% removal of propadiene with a loss of only 0.5–2.0% propylene. No deactivation of the catalyst was apparent from the many chemical analyses of the propylene product. Temperature measurements taken at various points along the catalyst bed showed that as the run progressed, a zone of maximum temperature moved from the inlet toward the outlet end of the bed. At the end of the forty-day run the active zone had very nearly reached the outlet of the bed, indicating that a sharp rise of propadiene in the effluent would probably have occurred. Thus, it appears that 40 days may be taken as a reasonably close estimate of the maximum run length obtainable at 200° F. without raising the reaction temperature or regenerating the catalyst.

The catalyst was next regenerated by steaming the catalyst at 750° F. for 8 hours followed by reduction and cooling with cylinder hydrogen. Throughout the next twenty days of operation, propadiene cleanup remained at about 95–100%. The active zone in the catalyst bed moved back to its initial position just inside the upstream end of the catalyst bed. Continued observation after regeneration indicated that the rate of movement down the bed was about the same as in the test period prior to regeneration.

The total time on stream for the charge of catalyst was 60 days. The catalyst strength after the test was substantially identical to its strength before the test. No fines or broken pellets were found upon unloading the catalyst bed.

EXAMPLE 3

To test the activity of this catalyst in removing acetylene a portion of catalyst prepared by the method set forth in Example 2 and containing .05% palladium was charged to a reactor, without reduction. A gas mixture corresponding to the so-called "deethanized gas" was passed over the catalyst. The gas had the following composition:

| | Percent |
|---|---|
| Ethylene | 70.00 |
| Methane | 27.00 |
| Propylene | 1.20 |
| Acetylene | 0.35 |
| Hydrogen | 0.70 |

During a period of over a month's testing, good tests showed complete removal of acetylene at temperature between 130° F. and 215° F. the pressure being maintained constant at 365 p.s.i.g. and at space velocities of 500 or greater. The following tabulation is typical of the activity of this catalyst during which it was regenerated repeatedly to establish its resistance to this treatment. Regeneration was effected by passing a mixture of 95% steam and 5% air at 1000 space velocity over the catalyst at 900° F. followed by reduction with hydrogen for eight hours at 750° F.

Table II
[Conditions: Pressure 365 p.s.i.g.]

| Day | Temp., °F. | S. V. | $C_2H_2$ out, p.p.m. | Number of Regenerations | Remarks |
|---|---|---|---|---|---|
| 1 | 130 | 500 | 0 | 0 | |
| 2 | 130 | 1,000 | 10 | 0 | |
| 4 | 130 | 1,000 | 5 | 1 | |
| 13 | 150 | 1,000 | 0 | 4 | |
| 17 | 150 | 2,000 | 1.3 | 6 | On stream after regeneration without reducing. |
| 18 | 130 | 1,000 | 0 | 6 | |

It is seen from the foregoing that the catalyst is not only highly active in hydrogenating propadiene in a propylene stream but also is effective in removing acetylene in an ethylene stream. It will be noted that although the gas was bone dry, the catalyst maintained its activity for continuous use without regeneration for forty hours on a bench scale and for forty days on a semi-commercial scale. It will also be appreciated that the catalyst has excellent activity at temperatures as low as 125° F. and at a space velocity of 1600 at that low temperature. The used catalyst when removed from the reactor appeared in excellent condition.

EXAMPLE 4

Pellets of Filtrol alumina ⅛ x ⅛ inch were sprayed with palladium chloride solution as in Example 2 to produce a catalyst containing 0.05% palladium on alumina. The catalyst was reduced for eight hours at 750° F. and 1000 S.V. with moist hydrogen. Then a gas mixture containing 85.5% propylene, 0.5% methylacetylene, 1.0% propadiene, 10% nitrogen and the remainder hydrogen at a pressure of 275 p.s.i.g. was passed over the catalyst at temperatures in the range of 125 to 300° F. and varying space velocities. The results of this test are given in the following table:

Table III
SELECTIVE HYDROGENATION OF METHYLACETYLENE AND PROPADIENE
[Constant condition: 275 p.s.i.g.]

| Hours on Stream | °F. | S. V.[1] | Methylacetylene Out, p.p.m. | Samp. Wt., Gms. |
|---|---|---|---|---|
| 2½ | 300 | 510 | 3 | [2]119 |
| 5 | 275 | 490 | 5 | 160 |
| 8½ | 250 | 450 | 0–5 | 40 |
| 10 | 215 | 440 | 0 | 217 |
| 15½ | 150 | 450 | 0 | 194 |
| 27 | 125 | 425 | 0 | 194 |
| 37 | 125 | 1,600 | 0 | 200 |
| 40 | 125 | 490 | 0 | 175 |

[1] S.V. calculated from sample wts.
[2] Samples analyzed and found to contain .02% propadiene in product. During this test for a short period of time the operating temperature dropped to 100° F. and the outlet methyl acetylene shot up to 700 p.p.m. giving an indication that the lowest temperature at which the catalyst is active is above 100° F.

Further tests for this catalyst on gas streams containing carbon monoxide were conducted and the results indicated that added carbon monoxide made it necessary to increase the temperature approximately 25° to achieve the same degree of selective hydrogenation of highly unsaturated hydrocarbons. A gas stream, as above, was selectively hydrogenated over the same catalyst at 275 p.s.i.g. The added hydrogen contained 2.5% carbon monoxide. The following results were obtained:

Table IV
SELECTIVE HYDROGENATION OF METHYLACETYLENE IN PRESENCE OF CO
[Constant condition: 275 p.s.i.g.]

| Hours on Stream | °F. | S. V.[1] | Methylacetylene out, p.p.m. | Sample Wt., Gms. | $H_2$ Conc., percent |
|---|---|---|---|---|---|
| 4 | 250 | 470 | 0 | 153 | 4.5 |
| 7½ | 250 | 720 | 19 | 339 | 4.5 |
| 34½ | 150 | 440 | 0 | 160 | 4.5 |
| 38½ | 100 | 485 | 750 | 247 | 4.5 |
| 44 | 125 | 475 | 113 | 230 | 4.5 |
| 49½ | 145 | 900 | 31 | 147 | 4.5 |
| 51¼ | 145 | 900 | 2,320 | 517 | 2 |
| 63¼ | 145 | 580 | 1,950 | 355 | 2 |
| 70¾ | 150 | 390 | 650 | 73 | 3 |
| 81¼ | 200 | 490 | 0 | 197 | 3 |
| 85¾ | 400 | 640 | 0 | 335 | 3 |

[1] S.V. calculated from sample wts.

The pore volume measurements referred to in the examples were made by the carbon tetrachloride adsorption method which is described by Benesi, Bonnar and Lee, Analytical Chemistry, p. 1963, December 1955. The procedure use with the catalyst prepared by the method described in Example 2 is used for purposes of description. One quart of the catalyst pellets was charged to a revolving drum about 10 inches in diameter and about 6 inches in length. The drum was equipped with a fin of about 2 inches in height running parallel to the length of the drum and projecting radially into the drum. The mechanism was adjusted to revolve at 60 r.p.m. The pellets were subjected to the abrasion of each other and to the impact of the fin at the above revolution rate for a period of four hours which resulted in a 0.3% weight loss. The powder representing the weight loss was considered the exterior or surface, whereas the remaining pills were considered the interior or cores. The cores were powdered before the determination. All samples were dried 1½ hours at 130° C. before the determination. Pore volume values obtained with each of the samples are tabulated below.

*Table V*

PORE VOLUME DETERMINATION OF SURFACE AND INTERIOR OF CATALYSTS

| Sample Description | Pore Volume, cc./g. | | | |
|---|---|---|---|---|
| | @ 800 A. | | @ 270 A. | |
| | Interior | Exterior | Interior | Exterior |
| Prepared by method of Example 2 | 0.31-0.31 | 0.27-0.29 | 0.29-0.28 | 0.23-0.23 |
| Prepared by method of Example 2 from another batch | 0.31-0.31 | 0.26-0.27 | 0.28-0.29 | 0.21-0.22 |
| Prepared by method of Example 1 | 0.36-0.36 | 0.35-0.34 | 0.34-0.34 | 0.33-0.33 |
| Impregnated by variation of Example 1* | 0.36-0.35 | 0.35-0.35 | | |

* Prepared by method of Example 1, except that the pH of the dip solution was lowered to 0.20 in order to prevent hydrolysis of palladium on the surface of the pellets.

It will be noted from the above data that the exterior surfaces of catalysts prepared by the method of Example 2 show a consistently lower pore volume than the interior pore volume of the same catalyst. However, the values for the interior and exterior pore volume of the impregnated catalysts prepared by the method of Example 1 are substantially the same. It will also be noted that the pore volumes of the interior of the catalyst of Example 2 is smaller than the pore volume of the interior of Example 1. It will also be noted that the difference in pore volume between the interior and exterior surfaces of the catalyst of Example 2 is slightly greater at the 270 A. level than at the 800 A. level.

The novel process of producing a palladium-alumina catalyst according to this invention involving the steps of spraying a limited volume of a solution of a palladium salt onto an alumina carrier having a pore volume in the range of from 0-.4 cc./gm. at the 800 A. level, calcining the resulting surface coated carrier to convert the palladium salt to the oxide and thereby reducing the pore volume of the interior and exterior of the catalyst is full set forth in foregoing examples, particularly Example 2.

Various modifications in the catalyst per se, such as will present themselves to those familiar in the art, may be made without departing from the spirit of this invention.

What is claimed as new and is desired to be secured by Letters Patent of the United States is:

1. A catalyst, suitable for selective hydrogenation of highly unsaturated hydrocarbons in a concentrated olefin stream, which comprises from 0.01 to 0.09% by weight of palladium metal on an alumina carrier, said catalyst characterized by a pore volume of surface pores having a threshold diameter not greater than 800 A. in the range of from 0.0 to 0.4 cc./gm. and further characterized in that the palladium is predominantly concentrated in the external portions of the carrier.

2. A method of selectively hydrogenating highly unsaturated hydrocarbons in a concentrated olefin stream which comprises passing said concentrated olefin stream over a palladium on alumina catalyst as defined by claim 1 at a temperature in the range of 100° to 400° F. and an hourly space velocity of 425 to 1600.

3. A palladium no alumina catalyst as defined by claim 1 consisting of 0.01 to 0.09% by weight of palladium on alumina having a surface pore volume of 0.0 to 0.4 cc./gm. at a threshold diameter not greater than 800 A.

4. A palladium on alumina catalyst as defined in claim 3 wherein the concentration of palladium is approximately 0.05%.

5. A palladium on alumina catalyst as defined in claim 3 wherein the pore volume of the exterior surface is 0.2 to 0.4 cc./gm. and the pore volume of the interior is 0.02 to 0.05 cc./gm. greater than that of the surface when measured as pores having threshold diameters not greater than 800 A., and wherein the pore volume of the exterior surface is 0.2 to 0.3 cc./gm. and the pore volume of the interior is 0.02 to 0.07 cc./gm. greater than that of the surface when measured as pores having threshold diameters not greater than 270 A.

6. A palladium on alumina catalyst as defined in claim 5 wherein the concentration of palladium is approximately 0.05%.

7. A catalyst, suitable for selective hydrogenation of highly unsaturated hydrocarbons in a concentrated olefin stream, which comprises from 0.01 to 0.09% by weight of palladium metal on an alumina carrier, said catalyst characterized by a pore volume of surface pores having a threshold diameter not greater than 800 A. in the range of from 0.0 to 0.4 cc./gm. and further characterized in that the pore volume of the interior pores of the carrier is 0.02 to 0.05 cc./gm. greater than the pore volume of the surface at the same level of measurement and the palladium is predominantly concentrated in the external portions of the carrier.

8. A method of making catalyst, suitable for the selective hydrogenation of highly unsaturated hydrocarbons in a concentrated olefin stream, which comprises the step of spraying a solution of a palladium salt onto an alumina carrier possessing an initial pore volume of from 0.00 to 0.40 cc./gm. of pores having a threshold diameter of less than 800 A., characterized in that the volume of the salt solution in relation to the volume of the solid carrier is in the range of from 1:12 to 1:5 and further characterized in that the concentration of the salt solution is regulated so as to produce a finished catalyst with a palladium concentration of from 0.01 to 0.09% by weight.

9. A method of making catalyst, suitable for the selective hydrogenation of highly unsaturated hydrocarbons in a concentrated olefin stream, which comprises the step of spraying a solution of a palladium salt onto an alumina carrier possessing an initial pore volume of from 0.00 to 0.40 cc./gm. of pores having a threshold diameter of less than 800 A. and an interior pore volume from 0.02 to 0.05 cc./gm. greater than the pore volume of the surface at the same level of measurement, characterized in that the volume of the salt solution in relation to the volume of the solid carrier is in the range of from 1:12 to 1:5 and further characterized in that the concentration of the salt solution is regulated so as to produce a finished catalyst with a palladium concentration of from 0.01 to 0.09% by weight.

References Cited in the file of this patent

UNITED STATES PATENTS

| | | |
|---|---|---|
| 2,272,711 | Hull | Feb. 10, 1942 |
| 2,400,012 | Littman | May 7, 1946 |
| 2,475,155 | Rosenblatt | July 5, 1949 |
| 2,802,889 | Frevel et al. | Aug. 13, 1957 |